United States Patent [19]

Logothetis

[11] Patent Number: 5,194,484
[45] Date of Patent: Mar. 16, 1993

[54] PROCESS FOR MAKING FLUOROPOLYMER COMPOSITES

[75] Inventor: Anestis L. Logothetis, Wilmington, Del.

[73] Assignee: E. I. du Pont de Nemours and Company, Wilmington, Del.

[21] Appl. No.: 765,634

[22] Filed: Sep. 25, 1991

[51] Int. Cl.⁵ .......................... C08K 3/40; C08K 3/04; B32B 27/00
[52] U.S. Cl. ..................... 524/494; 524/495; 524/496; 427/341; 427/342; 427/370; 264/49; 428/421; 428/237
[58] Field of Search ............... 524/494, 495, 496, 404; 427/340, 341, 342, 370; 264/49; 428/421, 237

[56] References Cited

U.S. PATENT DOCUMENTS

| | | | |
|---|---|---|---|
| 3,627,859 | 12/1971 | Mesiti et al. | 264/49 |
| 3,853,608 | 12/1974 | Hammer et al. | 117/140 |
| 4,163,742 | 8/1979 | Mansure | 260/42.17 |
| 4,328,151 | 5/1982 | Robinson | 524/495 |
| 4,400,434 | 8/1983 | Santuso et al. | 428/421 |
| 4,414,356 | 11/1983 | Michel | 524/496 |
| 4,693,928 | 9/1987 | Foss | 428/421 |
| 4,749,610 | 6/1988 | Katsuragawa | 428/421 |
| 4,975,321 | 12/1990 | Gentile et al. | 428/294 |

Primary Examiner—Paul R. Michl
Assistant Examiner—LaVonda R. Dewitt
Attorney, Agent, or Firm—Barbara C. Siegell

[57] ABSTRACT

A novel process for making fluoropolymer-fiber composites is disclosed, which produces composites with improved physical properties. The composites are useful in parts that require chemical and/or thermal stability, as in chemical process equipment.

21 Claims, No Drawings

PROCESS FOR MAKING FLUOROPOLYMER COMPOSITES

BACKGROUND OF THE INVENTION

1. Field of the Invention

A process for the production of composites containing reinforcing fiber and a fluoropolymer. The composites are useful in applications which require higher strength and/or modulus and/or lower creep, and where chemical and/or heat resistance is needed, as in chemical processing.

2. Technical Background

Polymeric composites consisting of a matrix resin (including fluoropolymers) and a reinforcing fiber are well known in the art. By adding the fiber to the matrix resin certain properties of the resin alone are often improved. These properties can include creep, tensile strength and modulus, flexural strength and modulus. Generally speaking, the reinforcing fiber chosen has a higher tensile modulus and strength than the polymer alone. When a fluoropolymer is used as the matrix resin, as described herein, the resulting composite often has many of the attributes of fluoropolymers such as high temperature resistance and chemical resistance, which make such composites useful in parts, for example, for the chemical processing industry and semiconductor industry. It is the object of this invention to provide a method for the production of such fluoropolymer composites that exhibit improved properties.

U.S. Pat. No. 3,627,859 discloses a method for the preparation of a coherent porous matrix of a fluorocarbon polymer by absorbing a cationic agent onto loose fiber, precipitating a fluorocarbon polymer from a colloidal state onto the fibers, shaping the aggregate and then sintering the aggregate to remove (pyrolyze) the fibers.

U.S. Pat. No. 3,853,608 describes a process for making a random fiber sheet material in which the fiber crossover points are bonded by a synthetic elastomer. The process involves multiple "impregnations" of the fibrous sheet with an aqueous dispersion of a synthetic elastomer, and various other steps.

U.S. Pat. Nos. 4,414,356 and 4,163,742 describe a process for making tetrafluoroethylene copolymer-graphite fiber composite by mixing the polymer and fiber together in a slurry and then removing the water to obtain an intimate mixture of fiber and polymer. No mention is made of precipitating the polymer onto the fiber.

SUMMARY OF THE INVENTION

This invention involves a process for the production of a fluoropolymer-fiber composite, comprising:
  contacting a fibrous material with an aqueous fluoropolymer dispersion;
  precipitating the fluoropolymer from said dispersion to form a structure of fluoropolymer particles dispersed on said fibrous material;
  drying said structure; and
  consolidating said structure by heating to a high enough temperature and applying sufficient pressure for a sufficient amount of time to form said structure into a solid shaped article.

DETAILS OF THE INVENTION

This invention involves the use of a "fluoropolymer" as the matrix resin in a polymer-fiber composite. By fluoropolymer is meant an organic polymer that contains at least about 10% fluorine by weight, preferably at least about 45% fluorine by weight, and it is especially preferred if the polymer is perfluorinated, i.e., contains essentially no hydrogen or halogen other than fluorine bound to carbon. Such fluoropolymers may be made, for example, using the monomers: vinyl fluoride; vinylidene fluoride; trifluoroethylene; chlorotrifluoroethylene; 1,2-difluoroethylene; tetra-fluoroethylene; hexafluoropropylene; perfluoro(methyl vinyl ether); perfluoro(propyl vinyl ether); perfluoro(2,2-dimethyl-1,3-dioxole); $CF_2=CFOCF_2CF(CF_3)OCF_2CF_2SO_2F$; $CF_2=CFOCF_2CF_2SO_2F$; $F(CF_2)_nCH_2OCF=CF_2$ where n is 1, 2, 3, 4 or 5; $R^1CH_2OCF=CF_2$ where $R^1$ is hydrogen or $F(CF_2)_m$—and m is 1, 2 or 3; and $R^3OCF=CH_2$ where $R^3$ is $F(CF_2)_z$—where z is 1, 2, 3 or 4. Preferred fluorinated monomers are 3,3,3-trifluoropropene, 2-trifluoromethyl-3,3,3-trifluoro-1-propene, vinyl fluoride, vinylidene fluoride, tetrafluoroethylene, hexafluoropropylene, perfluoro(methyl vinyl ether), perfluoro(propyl vinyl ether), and perfluoro(2,2-dimethyl-1,3-dioxole). An especially preferred monomer is tetrafluoroethylene, either as a homopolymer or a copolymer with one or more other perfluorinated monomers.

The fluoromonomer may be polymerized alone to form a homopolymer (if the fluoromonomer usually can be homopolymerized), or may be polymerized with one or more other fluoromonomers or other monomers which are not fluoromonomers to form a copolymer. If a copolymer is to be formed, the monomers chosen must copolymerize. Such copolymerizable monomer combinations are known. See for example D. P. Carlson and W. Schmiegel, in W. Gerhartz, et al., Ed., Ullmann's Encyclopedia of Industrial Chemistry, 5th Ed., vol. All, VCH Verlagsgesellschaft mbH, Weinheim, 1988, p. 393–429, and various individual articles in H. Mark et al., Ed., Encyclopedia of Polymer Science and Engineering, John Wiley & Sons, New York, 1985, both of which are hereby included by reference. Common comonomers (but they won't necessarily copolymerize with all combination of fluoromonomers) include propylene and ethylene. Useful copolymers that can be made by the instant process include, but are not limited to, tetrafluoroethylene/ hexafluoropropylene, tetrafluoroethylene/hexafluoropropylene/vinylidene fluoride, hexafluoropropylene/vinylidene fluoride, tetrafluoroethylene/perfluoro(propyl vinyl ether), tetrafluoroethylene/perfluoro(2,2-dimethyl-1,3-dioxole), tetrafluoroethylene/ethylene, tetrafluoroethylene/$CF_2=CFOCF_2CF(CF_3)OCF_2CF_2SO_2F$, tetrafluoroethylene/$CF_2=CFOCF_2CF_2SO_2F$, and tetrafluoroethylene/propylene. Especially preferred copolymers are tetrafluoroethylene/perfluoro(propyl vinyl ether) and tetrafluoroethylene/hexafluoropropylene. Tetrafluoroethylene/perfluoro(propyl vinyl ether) copolymers are most preferred.

The fluoropolymer in the aqueous dispersion may be a thermoplastic or elastomer, and it is preferred if the fluoropolymer is a thermoplastic. While applying heat and pressure to form a shaped article, the fluoropolymer may be crosslinked (vulcanized or cured for an elastomer) to form a thermoset article. Crosslinking agents may be present during this step to help effect the crosslinking.

Aqueous dispersions of fluoropolymers are well known. While they may be prepared directly from the polymer, they are most often obtained by an aqueous polymerization of the monomers, typically in the presence of one or more surfactants. By dispersion is meant an aqueous based suspension of particles that does not readily settle or is easily readily dispersible to a stable dispersion. The art skilled refer to these in various ways such as dispersions, emulsions, and latices. Descriptions of the preparation of these dispersions (and incidentally of the polymerizations themselves) are found, for example, in H. Mark, et al., Ed., Encyclopedia of Polymer Science and Technology, John Wiley & Sons, New York, 1985, vol. 7, p. 257–269, and vol. 16, p. 577–648, both of which are hereby included by reference.

The fibrous material used in the instant process may be any of a variety of fibers usually used for such purposes. Of course the fiber must be stable under the process conditions, not decomposing oxidatively or thermally, or reacting with the fluoropolymer. Fibers often used for this purpose include, but are not limited to, glass, graphite (carbon), fluorinated graphite, aramid such as poly(p-phenyleneterephthtalamide), boron nitride, silicon carbide, polyester, and polyamide. Graphite and fluorinated graphite are preferred fibers, and fluorinated graphite is especially preferred.

The fibers may be in a variety of forms for the present process. For example, the fiber may simply be chopped fiber that is mixed with the aqueous dispersion, but it is preferred if the fiber has some "order" to it. For example, the fiber may be in the form of paper, nonwoven (or random fiber) mat, woven cloth or continuous unidirectional fiber. Forms that may be made by the wet lay method from chopped or intermediate length fibers, such as paper, and nonwoven mat are preferred. An especially preferred combination is graphite or fluorinated graphite paper or nonwoven mat. By nonwoven is meant a random mat of fiber of intermediate length that may or may not have been consolidated into a sheet structure. Thus in contacting such a sheet with the aqueous dispersion, support (such as a screen) for the nonwoven mat may be needed.

As is well known to those skilled in the art, polymer-fiber composites with superior properties are produced when there is good adhesion between the polymer and the fiber. It is common in the art to use fibers that have been surface treated with materials to improve this adhesion, and the use of such coated fibers is contemplated herein. Such coated fibers are articles of commerce, and individual manufacturers make recommendations as to which fiber (and coating) should be used with any particular polymer.

Contacting the fibers with the aqueous fluoropolymer dispersion is most readily accomplished by immersing the fiber in the dispersion. Other methods, such as spraying and roll coating may be used. It is important that all of the fibers contact the dispersion, and for example that all air bubbles that hinder this be removed. If the fiber is in the form of a "loose" mat, care should be taken not to disturb the position of the fibers by the flow of the dispersion. Usually, after contacting the fibers, the aqueous dispersion will be allowed to drain for a short time, or preferably passed between two rolls, to remove excess dispersion. The fluoropolymer in the dispersion which is part of the mixture of the fiber and dispersion, is then precipitated on the fibers from, and in the presence of, water of the aqueous dispersion.

Precipitation of the polymer from the dispersion can be done in various ways and will depend somewhat on the makeup of the dispersion. For example, the fluoro-polymers in dispersions which are stabilized by anionic or cationic surfactants may be precipitated by adding strong acid or base. The fluoropolymers in dispersions that are stabilized by anionic, cationic or nonionic surfactants may be precipitated by the addition (usually as solutions) of strong electrolytes. A preferred method of precipitating the fluoropolymer is freezing the dispersion. Procedures for this are described in the Examples, and may also be done continuously, as on a "freeze roll".

After the fluoropolymer has been precipitated, the structure (or aggregation) of fibers with fluoropolymers uniformly dispersed and sticking or clinging to the fibers, is dried. Drying is usually accomplished by heating the structure in a stream of gas, typically air, to vaporize the water, and usually, any remaining surfactant.

This relatively open or porous structure is then solidified into a shaped article by subjecting the structure to heat and pressure for a sufficient amount of time to solidify it. The temperature, pressure and time required to do this will vary with such factors as the polymer, polymer viscosity, fiber configuration, and thickness. The polymer will usually be heated close to or above its glass transition or melting temperature, whichever is higher. It is possible to cause polymer flow below these temperatures, but it usually requires longer times and higher pressures. The pressure and time required is generally related to the polymer viscosity at the process temperature. The higher the viscosity, the higher the pressure and/or longer the time required. These factors are also affected by the fiber loading, with higher loadings generally requiring higher pressures and/or longer times. For any particular composition, these factors are readily determined by routine experimentation.

Pressure may be applied, for example, while the structure is in a die in a compression press, or if a flat sheet is desired, between the (heated) platens of a compression press. Other types of suitable equipment will be apparent to the art skilled.

Sufficient heat and pressure is applied to form a solid article. By "solid article" is meant something that is essentially free of pore and voids. The void content of the article can be estimated by measuring the density of the article. The percent voids can be taken as:

$$\% \text{ Voids} = \left[ 1.00 - \frac{\text{Measured Density of Article}}{\text{Theoretical Density of Article}} \right] \times 100$$

The theoretical density of the article is:

$$\text{Theoretical Density} = \frac{(\text{wt. FP}) \times d_{FP} + (\text{wt. fiber}) \times d_{fiber}}{\text{wt. FP} + \text{wt. fiber}}$$

where FP is fluoropolymer and d is density. If other ingredients are present, they are accounted for in an analogous manner. By solid is meant a "% Voids" of 10% or less, preferably 5% or less, and most preferably 2% or less.

It is believed that the instant process yields composite articles superior to those of the prior art, particularly in regard to certain physical properties such as tensile strength. It is hypothesized that this occurs because of a more even distribution of the fluoropolymer in the composite, particularly in relationship to the fiber present.

In the following Examples, Teflon ® PFA dispersion, is a Registered Trademark of and available from E. I. du Pont de Nemours & Co., Wilmington, DE, and is a polymer containing about 99 mole percent tetrafluoroethylene and 1 mole percent perfluoro(propyl vinyl ether). Hercules AS 1815 is a graphite fiber available from Hercules, Inc., Wilmington, DE. Reemay ® (Registered Trademark of and available from Reemay, Inc., Old Hickory, TN) is spun bonded sheet made from polyester. Celion ® C6NS graphite fiber is a Registered Trademark of and available from Hoechst-Celenese Corp.

GENERAL PROCEDURE

A mat is made from chopped graphite fiber (¼" or longer) using a wet lay technique common for making paper. No binder is incorporated. Preferred thickness of the mat can be varied from 10 mils to 250 mils but the more preferred range is 50-150 mils. The graphite fiber mat containing no binder is very weak to handle as is, so a thin sheet of spun bonded Remay ® which allows the dispersion to go through, is used to cover the graphite mat, thus making the handling much easier. Other materials such as a loose knit glass cloth or a thin metal screen can also be used to support the fragile graphite mat. These covers can be removed later before the drying step and be reused.

The dry mat is slowly passed through a Teflon ® PFA dispersion containing 20-60% polymer. The polymer concentration determines how much polymer ends up in the composite. The higher the concentration of the polymer in the dispersion the higher the amount of the resin in the composite. The mat absorbs the dispersion and gets saturated almost immediately. After about 10-30 seconds in the bath the wet mat is passed through two rolls to remove excess dispersion. The mat is then passed through a cold bath (below 0° C., liquid nitrogen, dry-ice/acetone or an alcohol bath) to freeze the dispersion and coagulate the polymer on the fibers.

The mat is dried in an oven at 100°-130° C., and then the Reemay ® cover is removed and the mat is placed in a furnace at 250°-300° C. to drive away any remaining surfactant.

The dried mat, impregnated with the polymer, is placed in a compression press whose platens are heated to 340° C. and pressed under 100-500 psi for 10-20 min. Composite sheets of 10-50 mil thickness can be made this way depending on the thickness of the starting graphite mat. Thicker parts, 0.1-5" thick, can be made by putting a number of sheets together in a vacuum mold and consolidate the parts at 340°-350° C. under 100-150 psi for 10-60 min.

EXAMPLE 1

Using the General Procedure, a 4"×6" mat made from Hercules AS 1815 chopped ¼" fiber of about 75 mil thickness was passed through a Teflon ® PFA dispersion containing 30% solids by weight. The fiber mat before immersion in the dispersion weighed 3.61 g, and after drying at 300° C. weighed 17.05 g, indicating that the composite contained 21.2 wt. % fiber. The tensile strength of the composite made after pressing it at 340° C. (5 samples) averaged 20,857 psi, and elongation at break 5%, using the ASTM D1708 test.

EXAMPLE 2

The same procedure as Example 1 was used except the 4"×6" mat was passed through a Teflon ® PFA dispersion containing 34% solids by weight. The composite made contained 18.7 wt. % fiber and 5 samples averaged tensile strength of 18,259 psi, and elongation at break of 5.6%, using the ASTM D1708 test.

EXAMPLE 3

The same procedure as Example 1 was used except the 4"×6" mat was passed through a Teflon ® PFA dispersion containing 40% solids by weight. The composite made contained 15.6 wt. % fiber and 5 samples averaged tensile strength of 19,771 psi and elongation at break of 5% using ASTM D1708.

EXAMPLE 4

A number of consolidated sheets of about 30 mil thickness were made using the above General Procedure. They averaged 20.8 wt. % fiber, the rest being the polymer. They were cut into 3"×6" size sheets and placed in a vacuum mold and heated at 350° C. under 500 psi for 1 hour. The consolidated thick piece was 3"×6" and 0.5" thick and was machined into the test samples required by the ASTM procedures. The test results are shown below:

| | |
|---|---|
| Compressive strength | 34,866 psi (ASTM D695)[a] |
| Flexural strength | 23,291 psi (ASTM D790) |
| Flexural Modulus | 1,878 ksi (ASTM D790) |

[a]Modified to utilize 0.5" × 0.5" × 0.5" cubic specimen.

EXAMPLE 5

Wet lay mat pieces of Celion ® C6NS and Hercules AS 1815 fiber were fluorinated in an autoclave using a mixture of 25/75 fluorine/nitrogen at about 300 psi. Consolidated sheets were made using the General Procedure. The tensile properties as shown in Table 1 and 2 indicate an improvement in the tensile strength, particularly for the Celion ® fiber, when the fiber is fluorinated. Fluorination conditions may vary from 25° C. to 250° C.

TABLE 1

Effect of Fluorination of Fiber on Tensile Strength

| | Fluorination[1] TEMP/TIME | $T_b^{2,3}$ psi | CV % |
|---|---|---|---|
| Celion ® C6NS | Control | 10,503 | 20.6 |
| Celion ® C6NS | 25° C./6 h | 17,186 | 5.2 |
| Celion ® C6NS | 100° C./6 h | 19,213 | 5.4 |
| Celion ® C6NS | 250° C./6 h | 19,071 | 9.8 |
| Hercules AS 1815 | CONTROL | 16,851 | 10.2 |
| Hercules AS 1815 | 250° C./6 h | 17,102 | 10.2 |

[1]A mixture of 25/75 $F_2/N_2$ was used at 300 psi.
[2]ASTM D1708 used for the tensiles.
[3]The fiber is 20 vol. % of the composite.

TABLE 2

Tensile Properties of Composites From Fluorinated Fibers[1]

| | Tensile Strength[2] (PSI) |
|---|---|
| 19 VOL. % | |
| Celion ™ Control | 10,503 |
| Celion ™ Fluorinated | 20,595 |
| 25 VOL. % FIBER | |
| Celion ™ Control | 9,197 |
| Celion ™ Fluorinated | 22,115 |
| 37 VOL. % | |
| Celion ™ Control | FAILED TO MAKE DEFECT FREE PARTS |

TABLE 2-continued

Tensile Properties of
Composites From Fluorinated Fibers[1]

| | Tensile Strength[2] (PSI) |
|---|---|
| Celion TM Fluorinated | 21,068 |

[1]The fluorination took place at 250° C. for 4 hr. with a 25/75 mixture of fluorine/nitrogen at 300 psi.
[2]The tensiles were measured using ASTM D1708.

Although preferred embodiments of the invention have been described hereinabove, it is to be understood that there is no intention to limit the invention to the precise constructions herein disclosed, and it is to be further understood that the right is reserved to all changes coming within the scope of the invention as defined by the appended claims.

What is claimed is:

1. A process for the production of a fluoropolymer-fiber composite, comprising:
   contacting a fibrous material with an aqueous fluoropolymer dispersion;
   precipitating the fluoropolymer from said dispersion to form a structure of fluoropolymer particles dispersed on said fibrous material;
   drying said structure; and
   consolidating said structure by heating to a high enough temperature and applying sufficient pressure for a sufficient amount of time to form said structure into a solid shaped article.

2. The process as recited in claim 1 wherein said fluoropolymer contains at least about 45% by weight of fluorine.

3. The process as recited in claim 1 wherein said fluoropolymer is perfluorinated.

4. The process as recited in claim 1 wherein said fluoropolymer is a thermoplastic.

5. The process as recited in claim 1 wherein said fluoropolymer comprises a monomer selected from the group consisting of vinyl fluoride; vinylidene fluoride; trifluoroethylene; chlorotrifluoroethylene; 1,2-difluoroethylene; tetrafluoroethylene; hexafluoropropylene; perfluoro(methyl vinyl ether); perfluoro(propyl vinyl ether); perfluoro(2,2-dimethyl-1,3-dioxole); $CF_2=CFOCF_2CF(CF_3)OCF_2CF_2SO_2F$; $CF_2=CFOCF_2CF_2SO_2F$; $F(CF_2)_nCH_2OCF=CF_2$ where n is 1, 2, 3, 4 or 5; $R^1CH_2OCF=CF_2$ where $R^1$ is hydrogen or $F(CF_2)_m$—and m is 1, 2 or 3; and $R^3OCF=CH_2$ where $R^3$ is $F(CF_2)_z$—where z is 1, 2, 3 or 4.

6. The process as recited in claim 5 wherein said fluoropolymer comprises a monomer selected from the group consisting of 3,3,3-trifluoropropene, 2-trifluoromethyl-3,3,3-trifluoro-1-propene, vinyl fluoride, vinylidene fluoride, tetrafluoroethylene, hexafluoropropylene, perfluoro(methyl vinyl ether), perfluoro(propyl vinyl ether), and perfluoro(2,2-dimethyl-1,3-dioxole).

7. The process as recited in claim 6 wherein said fluoropolymer comprises tetrafluoroethylene monomer.

8. The process as recited in claim 7 wherein said fluoropolymer is a copolymer which is perfluorinated.

9. The process as recited in claim 1 wherein said fluorolpolymer is a copolymer selected from the group consisting of tetrafluoroethylene/hexafluoropropylene, tetrafluoroethylene/hexafluoropropylene/vinylidene fluoride, hexafluoropropylene/vinylidene fluoride, tetrafluoroethylene/perfluoro(propyl vinyl ether), tetrafluoroethylene/perfluoro(2,2-dimethyl-1,3-dioxole), tetrafluoroethylene/ethylene, tetrafluoroethylene/$CF_2=CFOCF_2CF(CF_3)OCF_2CF_2SO_2F$, tetrafluoroethylene/$CF_2=CFOCF_2CF_2SO_2F$, and tetrafluoroethylene/propylene.

10. The process as recited in claim 9 wherein said copolymer is selected from the group consisting of tetrafluoroethylene/perfluoro(propyl vinyl ether) and tetrafluoroethylene/hexafluoropropylene.

11. The process as recited in claim 10 wherein said copolymer is tetrafluoroethylene/perfluoro(propyl vinyl ether).

12. The process as recited in claim 1 wherein said fibrous material is selected from the group consisting of glass, graphite (carbon), fluorinated graphite, aramid, boron nitride, silicon carbide, polyester, and polyamide.

13. The process as recited in claim 12 wherein said fibrous material is selected from the group consisting of graphite and fluorinated graphite.

14. The process as recited in claim 13 wherein said fibrous material is fluorinated graphite.

15. The process as recited in claim 1 wherein said fibrous material is in the form of paper, nonwoven mat, woven cloth, or continuous unidirectional fiber.

16. The process as recited in claim 15 herein said fibrous material is in the form of paper or nonwoven mat.

17. The process as recited in claim 13 herein said fibrous material is in the form of paper or nonwoven mat.

18. The process as recited in claim 10 wherein said fibrous material is selected from the group consisting of graphite and fluorinated graphite.

19. The process as recited in claim 11 wherein said fibrous material is selected from the group consisting of graphite and fluorinated graphite.

20. The process as recited in claim 18 herein said fibrous material is in the form of paper or nonwoven mat.

21. The process as recited in claim 19 herein said fibrous material is in the form of paper or nonwoven mat.

* * * * *